United States Patent [19]
Cohen

[11] Patent Number: 5,054,905
[45] Date of Patent: Oct. 8, 1991

[54] PROGRESSIVE INTENSITY PHASE BIFOCAL

[76] Inventor: Allen L. Cohen, 10010 Walsham Ct., Richmond, Va. 23233

[21] Appl. No.: 438,320

[22] Filed: Nov. 20, 1989

Related U.S. Application Data

[63] Continuation-in-part of Ser. No. 120,262, Nov. 12, 1987, Pat. No. 4,881,805.

[51] Int. Cl.$^5$ .................... G02C 7/04; G02B 27/44; G02B 5/18; A61F 2/16
[52] U.S. Cl. ....................................... 351/161; 623/6; 359/565; 359/569; 359/571; 359/573
[58] Field of Search ................ 350/162.16, 162.21, 350/162.20, 162.22, 162.24; 351/160 R, 160 H, 161, 162; 623/6

[56] References Cited

U.S. PATENT DOCUMENTS

| | | |
|---|---|---|
| 3,309,162 | 3/1967 | Kosanke et al. |
| 3,312,519 | 4/1967 | Max |
| 3,728,009 | 4/1973 | Fedotowsky et al. |
| 4,198,132 | 4/1980 | Seger et al. |
| 4,210,391 | 7/1980 | Cohen |
| 4,338,005 | 7/1982 | Cohen |
| 4,340,283 | 7/1982 | Cohen |
| 4,704,016 | 11/1987 | de Carle |
| 4,995,714 | 2/1991 | Cohen |

OTHER PUBLICATIONS

Genovese, F. C. et al.; "Phase Lens for a Multiplex Image Lens System"; *IBM Tech. Discl. Bulletin;* vol. 8, No. 12; May 1966; pp. 1796–1797.

*Primary Examiner*—Scott J. Sugarman
*Attorney, Agent, or Firm*—Finnegan, Henderson, Farabow, Garrett & Dunner

[57] ABSTRACT

An ophthalmic lens including a carrier lens having an anterior and a posterior surface. A zone plate is having a plurality of zones is disposed annularly about the optical axis of the carrier lens on at least one of the anterior or posterior sides. Each of the zones of the zone plate is spaced from the optical axis in proportion to the square root of n, where n is the zone number. At least one echelette is disposed in each of the zones, each of the echelettes having a surface through which light propagating along the optical axis traverses. The surface of the echelettes varies in a predetermined manner from the zone nearest the optical axis to the zone furthest from the optical axis so that as the size of the aperture disposed along the optical axis changes, the relative intensity of light diffracted to desired orders changes. A step is provided between each of the echelettes, the height of each step having substantially the same optical path length.

26 Claims, 4 Drawing Sheets

FIG. 1
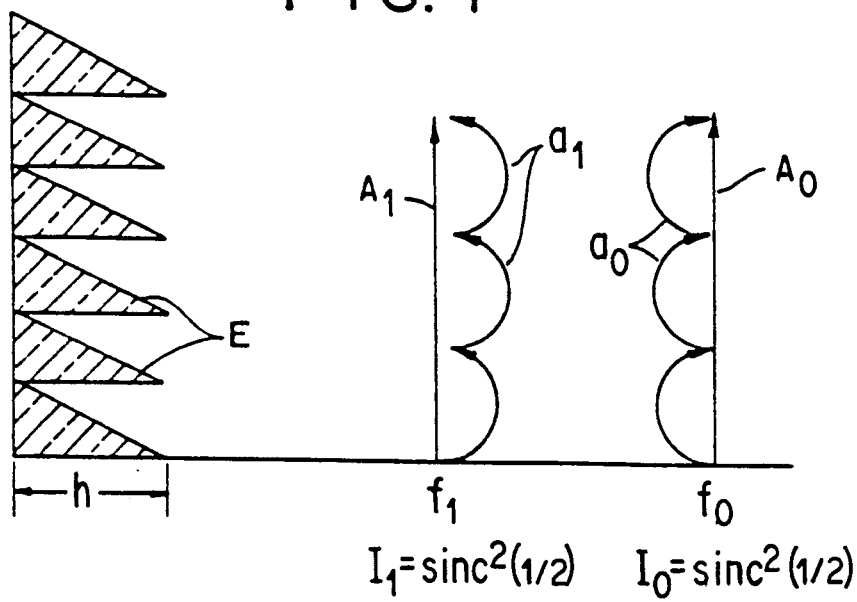
$I_1 = \text{sinc}^2(1/2) \quad I_0 = \text{sinc}^2(1/2)$
FIG. 2
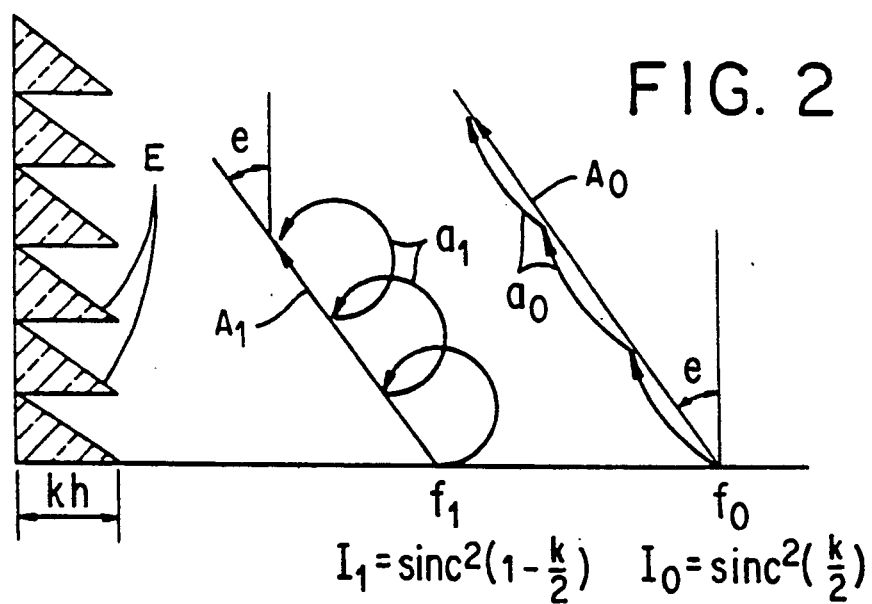
$I_1 = \text{sinc}^2(1 - \frac{k}{2}) \quad I_0 = \text{sinc}^2(\frac{k}{2})$
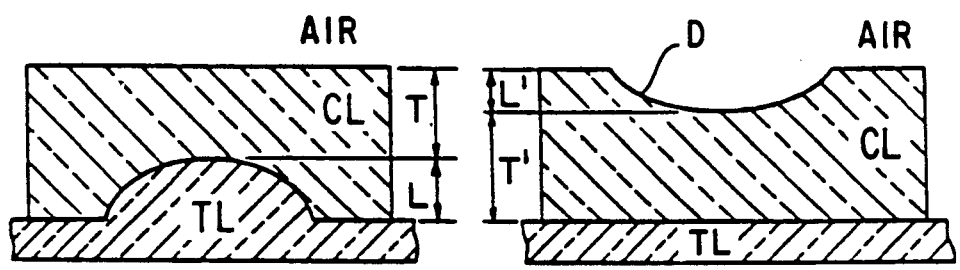
LENS WITH NO DRAPAGE
LENS UNDERGOING DRAPAGE
FIG. 5A    FIG. 5B

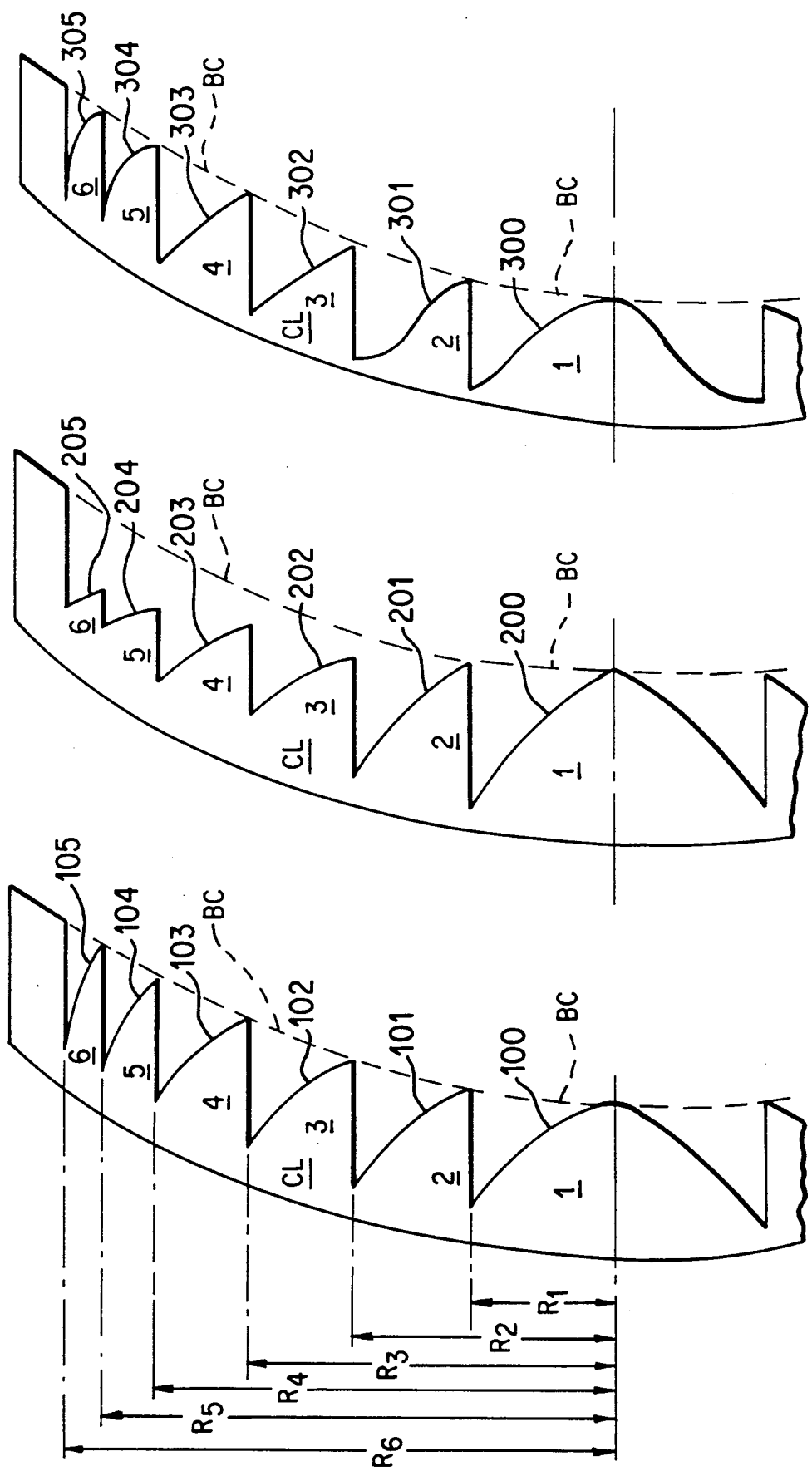

PROGRESSIVE INTENSITY PHASE BIFOCAL

RELATED APPLICATIONS

This application is a continuation-in-part application of U.S. Pat. No. 4,881,805 issued on Nov. 21, 1989 from U.S. application Ser. No. 07/120,262, filed on Nov. 12, 1987.

BACKGROUND OF THE INVENTION

1. Field of the Invention

This invention relates to ophthalmic lenses and, in particular, to multifocal ophthalmic lenses. More particularly, this invention relates to an improvement in phase plate optics as applied to ophthalmic lenses.

2. Description of the Related Art

This invention concerns ophthalmic lenses such as contact lenses, intraocular lenses (IOL's) and, more particularly, such lenses utilizing phase plate optics, such as phase plate bifocals and "tuned" Fresnel lenses making use of concentric annular zones. Such lenses generally follow the designs described, for example, by Allen L. Cohen in U.S. Pat. Nos. 4,210,391; 4,338,005; and 4,340,283 (hereinafter "the Cohen patents").

The lens design described in the Cohen patents provides that the radii "$r_n$" of the annular and concentric zones are substantially proportional to $\sqrt{n}$ and that the zones are configured so as to direct light to more than one focal point. Such a lens design with phase plate optics allows lens constructions which are exceptionally thin. Contact lenses may be designed with phase plate optics in order to achieve a bifocal or multifocal effect. The specific chromatic properties of a phase plate may be incorporated in the design of a contact lens including a contact lens having multifocal properties.

There is also the need in multifocal lenses to have the capability of varying the intensity of light through a lens to accommodate pupil dilation and constriction. It is known that a pupil can vary from 3 mm to 6 mm, depending upon the level of ambient illumination. It would be desirable to be able to vary the distribution of energy between distance and near focal point according to the user's needs. For example, in dim illumination, the user of a contact lens will be typically engaged in distance viewing, such as driving an automobile. It would be desirable to have a contact lens which accommodates that condition.

Conversely, a user may seek to have maximum preference of light intensity to the near focus of the lens, yet would require a reasonable intensity of light for distance viewing. It would be desirable to have lenses that can be biased to a user's requirements for light intensity.

The nature of the light intensity problem is illustrated by reference to FIGS. 1 and 2. The lens portion depicted in FIG. 1 is a cross-sectional side view of a portion of a half-wave bifocal phase plate with the echelette depths h given by the equation:

$$h = \lambda/2(n' - n),$$

where:
$\lambda$ = wavelength of light;
$n'$ = refractive index of the contact lens; and
$n$ = refractive index of tear layer or eye.

In FIG. 1 the individual amplitudes of light $a_0$ and $a_1$ are formed by the individual echelettes E. The total resultant amplitudes of light $A_0$ and $A_1$ formed at the $0^{th}$ and $1^{st}$ diffractive foci are also shown in FIG. 1. In this illustration, the equal length of vectors $A_0$ and $A_1$ demonstrates that the intensity of light is split equally between the two focal points. The intensities at the $0^{th}$ order and the $1^{st}$ order diffractive foci, $I_0$ and $I_1$, respectively, are given by:

$$I_0 = \text{sinc}^2(\tfrac{1}{2})$$

$$I_1 = \text{sinc}^2(\tfrac{1}{2}).$$

It is not necessary for a bifocal phase plate to split the incident light equally between its two diffractive foci when the vectors $A_0$ and $A_1$ are in parallel. This is shown in FIG. 2 of the cross-section of a portion of a bifocal phase plate with the echelette depths d given by the formula:

$$d = k \times h,$$

where:
$h = \lambda/2(n' - n)$;
and
$0 < k < 2$, where k is an arbitrary number.

In the case of the FIG. 2 illustration, the intensity of light is not split equally between the two focal points. The intensities at the $0^{th}$ order and $1^{st}$ order diffractive foci, $I_0$ and $I_1$, respectively, of this example are derived from the following equations:

$$I_0 = \text{sinc}^2(k/2)$$

$$I_1 = \text{sinc}^2(1 - k/2)$$

In this case, the amplitudes of light $A_0$ and $A_1$ are shifted in phase to parallel non-vertical aligned amplitudes produced by half-wave bifocal phase plate. The phase shift e is derived from the equation:

$$e = (1 - k)\pi/2$$

Though the current developments are significant improvements in the art, there is always a need to improve on the adaptability of the lenses to pupil-diameter variations and decentration. It is desirable to provide bifocal performance of a lens of the Cohen design with the feature that it can shift focused light from the distant to near focal points in coordination with the human eye's pupil, which normally constricts during near viewing.

It has been determined that contact lenses with phase plate optics may generate a few problems for the wearer. One is the glare that results from the non-optical edges of the steps between the annularly arranged echelettes that make up a phase plate and appear through wave interference as a disconcerting, intense light to the contact lens user.

Another potential problem stems from the need in soft contact lenses to have sufficient mobility when fit to the cornea to allow tear fluid exchange for cleansing the surface of the eye of metabolic waste. A further potential problem is the inability of the soft lens to move sufficiently during wearing to satisfy the just-described needed mobility.

The provision of a multiplicity of Fresnel echelettes in the annular zone plate arrangement of the Cohen lens design in a soft contact lens tends to limit the mobility of the lens. It would be desirable to incorporate into the design of such lenses sufficient mobility that the lens has the capacity of moving about 0.5 to about 1 millimeter of distance during wearing. This would enhance the ability of the lens to allow management of the buildup of metabolic waste under the lens.

It is another feature of this invention to provide a multifocal contact lens design encompassed within the annular arrangement of the Cohen patents which minimizes the effects of glare from the non-optical edges and/or possesses the requisite mobility during use, as characterized above.

BRIEF DESCRIPTION OF THE INVENTION

This invention relates to an ophthalmic lens such as contact and intraocular lenses containing more than one phase plate within its optic zone. A preferred aspect of the invention is directed to an ophthalmic contact lens containing at least two phase plates within its optic zone. The invention contemplates the creation of a resultant wavefront derived from the contribution through interference of the wavefronts emanating from each phase plate.

In another aspect, this invention relates to a contact lens which possesses phase plate optics within its optic zone that progressively shift the intensity of light as the pupil diameter changes. This is accomplished by providing an ophthalmic lens that comprises a carrier lens having an anterior surface and a posterior surface. A zone plate is disposed about an optical axis of the carrier lens on at least one of the anterior and posterior surfaces. The zone plate has a plurality of annular zones, each of which is spaced from the optical axis by a distance proportional to the square root of n, where n is the number of the zone starting from the optical axis. Each of the zones is formed having at least one echelette and each of the echelettes has a surface through which light propagating parallel to the optical axis and incident upon the zone plate is diffracted to at least two focal points. The surfaces of the echelettes are relatively configured so as to cause the relative intensities of light diffracted to the at least two focal points to vary as the size of an aperture disposed along the optical axis adjacent to the carrier lens is varied within the diameter of the zone plate.

BRIEF DESCRIPTION OF THE DRAWINGS

The accompanying drawings, which are incorporated in and constitute a part of this specification, illustrate one embodiment of the invention and together with the description, serve to explain the principles of the invention.

FIG. 1 illustrates a cross-sectional side view of a portion of a half-wave bifocal phase plate with echelettes E formed to the depth h. It characterizes the individual amplitudes of light $a_0$ and $a_1$ formed by the individual echelettes E. The vector analysis depicts the total resultant amplitudes of light $A_0$ and $A_1$ formed at the $0^{th}$ and $1^{st}$ diffractive foci.

FIG. 2 illustrates a cross-sectional side view of a portion of a bifocal phase plate with echelettes E formed to the depth kh. It characterizes the individual amplitudes of light $a_0$ and $a_1$ formed by the individual echelettes E. The . vector analysis depicts the total resultant amplitudes of light $A_0$ and $A_1$ formed at the and $1^{st}$ diffractive foci.

FIG. 5A and 5B illustrate a cross-sectional view of a soft contact lens CL resting upon a tear layer TL demonstrating, as noted, a tear lens without drapage and an air lens formed by the dimpled surface D when drapage occurs, respectively.

FIG. 11A illustrates a cross-sectional side view of a contact lens CL designed with base curve BC. This lens contains a phase plate with echelettes of the same depth and having a parabolic profile;

FIG. 11B illustrates a cross-sectional side view of a contact lens CL designed with base curve BC. This lens contains a phase plate with echelettes of varying depth and having a parabolic profile; and FIG. 11C illustrates a cross-sectional side view of a contact lens CL designed with base curve BC. This lens contains a phase plate with echelettes of the same depth and having surface profiles that vary.

DESCRIPTION OF THE PREFERRED EMBODIMENT

The bifocal performance of the lens of this invention stems from the feature that it can shift focused light from distance to near in coordination with change in the size of an aperture. When the present invention is used in combination with a human eye, the aperture is the human eye's pupil, which normally constricts under conditions of elevated light intensity. The lens can reduce the level of glare by reducing echelette depth at the lens periphery.

The invention comprises a contact lens with an optic zone formed as a composite of more than one phase plate of different dimensions, preferably two or more different phase plates of different dimensions. Apart from the Cohen patents there are no guiding principles in the art for incorporating multiple phase plates within the optic zone of a multifocal contact lens. The prior art does not teach how to form a composite lens in a manner such that the various phase plates will interact in a functionally acceptable fashion to overcome the problems cited above.

It has been determined that each phase plate should obey a common phase plate formula in order to have them all contribute light to the same foci. The radii relationship of the phase plate zones r, follows the following formula:

$$r_m = \sqrt{2m\lambda f}$$

where:
$\lambda$ = the wavelength of light; and
f = focal length of $1^{st}$ order diffraction.

Thus, the position of the $m^{th}$ zone of the composite lens depends on a single formula for $r_m$, independent of the phase plate to which the zone belongs.

It would be advantageous if the separate phase plates of a lens in accordance with the Cohen patents or a separate phase plate plus part of another phase plate contributed light aligned in phase. One way to accomplish this is to have each phase plate associated with a phase channel introduce a compensating phase shift such that the total phase shift e is identical for each phase plate/phase channel, as observed in FIG. 4.

Figure 3:
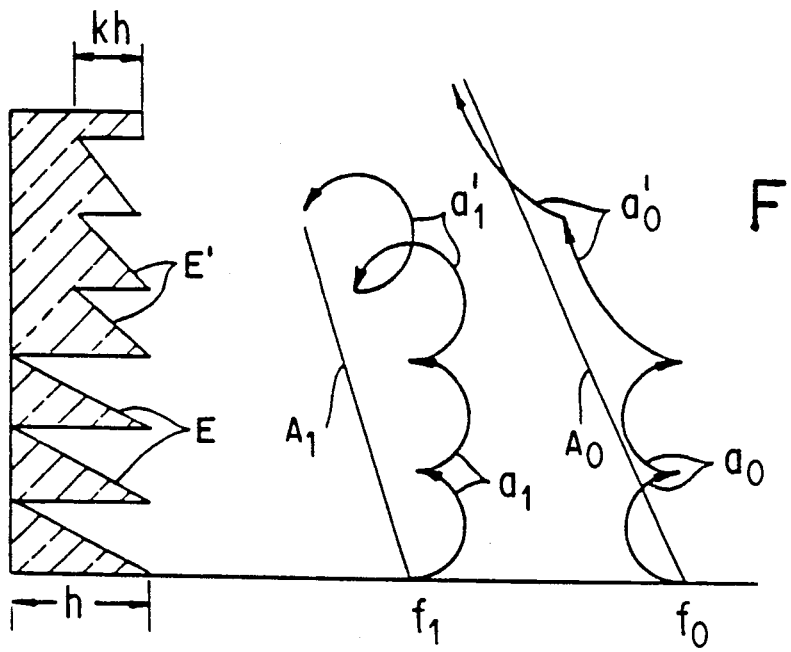
FIG. 3 illustrates a cross-sectional side view of a portion of a bifocal lens consisting of two separate phase plates with echelettes E and E' formed to the depths h and kh, respectively. It characterizes the individual amplitudes of light $a_0$ and $a'_0$ and the resultant amplitude of light $A_0$ formed at the $0^{th}$ diffractive focus and the individual amplitudes of light $a_1$ and $a'_1$ and the resultant amplitude of light $A_1$ formed at the $1^{st}$ diffractive focus.

The FIG. 3 bifocal contact lens has an optic zone which contains two separate phase plates. In that characterization, all of the zones are positioned according to a single phase plate spacing as mentioned above to be desirable. However, the characterization fails to account for the phase shift that occurs at the transition between the phase plates. Therefore, FIG. 3 demonstrates that the individual amplitudes of light $a_0$ and $a'_0$ formed by the echelettes E and E' of the two phase plates are not in phase. As a result, the total resultant amplitude of light $A_0$, formed at the $0^{th}$ diffractive focus, is diminished from its maximum possible magnitude. The same situation occurs at the $1^{st}$ diffractive focus.

Figure 4:
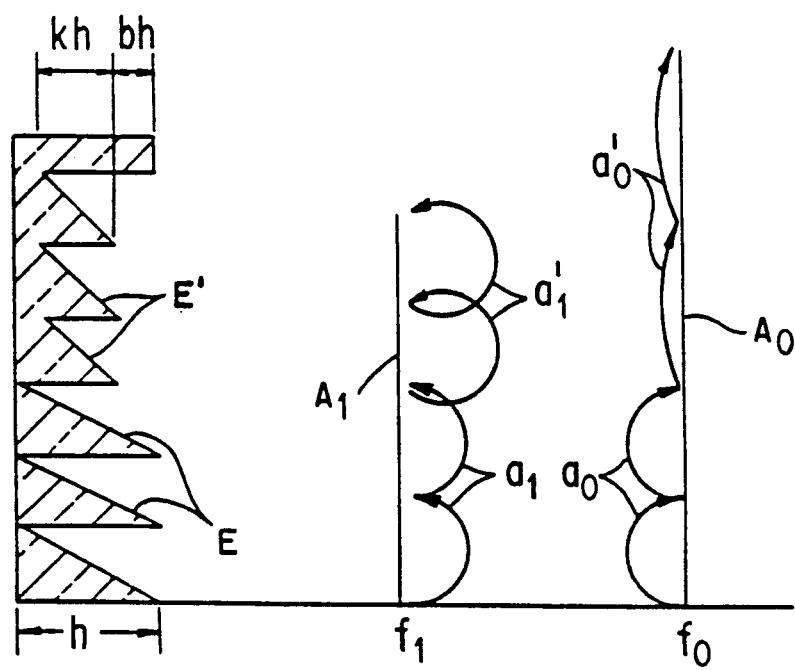
FIG. 4 illustrates a cross-sectional side view of a portion of a bifocal lens consisting of two separate phase plates and a phase channel of depth bh. It characterizes the individual amplitudes of light $a_0$, $a'_0$, $a_1$ and $a'_1$ formed by the individual echelettes E and E' of the separate phase plates. It shows the total resultant amplitudes $A_0$ and $A_1$ formed at the $0^{th}$ and $1^{st}$ diffractive foci.

FIG. 4 also depicts a bifocal contact lens having an optic zone containing two separate phase plates. However, in this case, a channel of depth d=bh is provided to bring the phases of light into alignment. The depth is determined from the formula:

$$b = (1-k)/2,$$

where k is as previously defined.

Because of this channel, the total resultant amplitudes of light $A_0$ and $A_1$ formed at the $0^{th}$ and $1^{st}$ diffractive foci achieve their maximum possible magnitude. It should be noticed that setting the channels at a depth d as described above is equivalent to requiring that the line through the centers of all of the resulting echelettes essentially parallels the base curve and is set back from the base curve by one-half the depth of the deepest echelette.

Soft contact lenses usually exhibit the phenomenon of draping. It is generally assumed and expected that a soft contact lens will drape upon and take the shape and form of the surface of the eye upon which it is fitted. FIGS. 5A and 5B illustrate a soft contact lens designed to have a center thickness T and a tear layer thickness L. However, because of drapage, it must be redesigned with a center thickness T' in order to account for the absence of the tear layer and the addition of an air lens formed by the depression D in the contact lens surface. Thus, incorporating these factors into the standard contact lens formulas for drapage, there is obtained the expression:

$$T' = T + L(n-1)/(n'-1).$$

Figure 6:
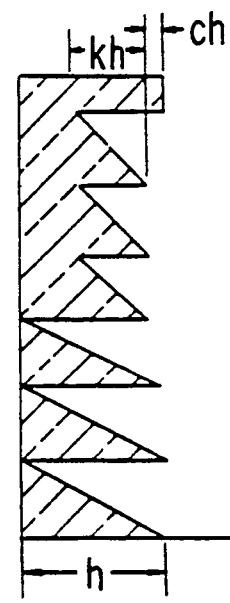
FIG. 6 illustrates a cross-sectional side view of a portion of a bifocal lens containing two separate phase plates with echelette depths of h and kh, respectively, and a phase channel of depth ch.

A soft contact lens designed as a composite of different phase plates, each with an associated channel, will allow the phase channels to smoothly drape upon the eye simply by adjusting the phase channel depths to compensate for drapage. Reference is made to the teachings of copending U.S. patent application Ser. No. 07/120,265 now U.S. Pat. No. 4,881,804 about the role and function of phase channels and is incorporated herein by reference. The lens shown in FIG. 6 with a phase channel of depth ch above the base curve of the lens, c is determined by the equation:

$$c = b(n'-n)/(n-1).$$

Figure 7:
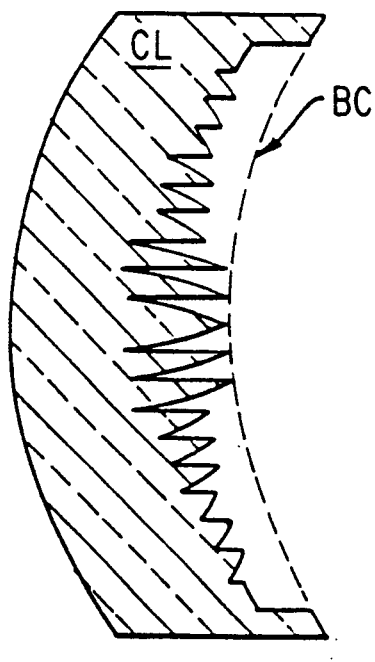
FIG. 7 illustrates a cross-sectional side view of a contact lens CL designed with base curve BC. This lens contains three separate phase plates each comprising three echelettes cut to a specific depth. The outer two phase plates are set back from the base curve of the lens to form phase shifting channels such that a line through the centers of the echelettes is parallel to the base curve.

The embodiment of the invention shown in FIG. 7 encompasses a contact lens CL having a posterior surface matched to a base curve BC. Cut into the base curve centrally is a half wave phase plate with three annular zones of echelettes which are one-half wavelength deep. Cut into the intermediate portion of the base curve is another phase plate with three annular zones. The echelettes of this phase plate are of slightly less depth and are set slightly back from the base curve of the lens. The outermost portion of the base curve is cut with still another three annular zone phase plate. The echelette depths of this most peripheral phase plate are the shallowest, and most set back from the base curve. According to this invention, the line through the centers of all of the echelettes parallels the base curve and is set back from the base curve by a quarter-wave.

Figure 8:
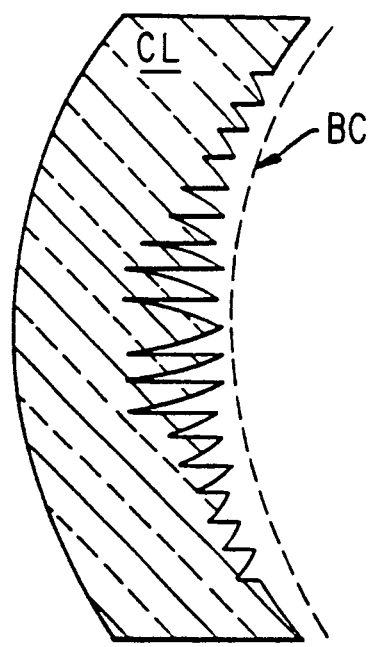
FIG. 8 shows a cross-sectional side view of a contact lens CL designed with base curve BC. This lens contains three separate phase plates each comprising three echelettes cut to a specific depth. The outer two phase plates are set back from the base curve of the lens to form phase shifting channels that are compensated to allow the lens to drape to the base curve.

The embodiment of the invention shown in FIG. 8 depicts a contact lens CL having a posterior surface matched to a base curve BC. This lens comprises three separate annular phase plates each containing three annular echelettes cut to a specific depth. In this lens, the outer two phase plates are set back from the base curve of the lens to form phase shifting channels that are compensated to allow the lens to drape to the base curve according to the invention. Hence, the line through the centers of all of the echelettes in this lens does not parallel the base curve, but rather is steeper until the lens is placed on the eye and allowed to drape whereupon the centers will essentially parallel the base curve.

Figure 9:
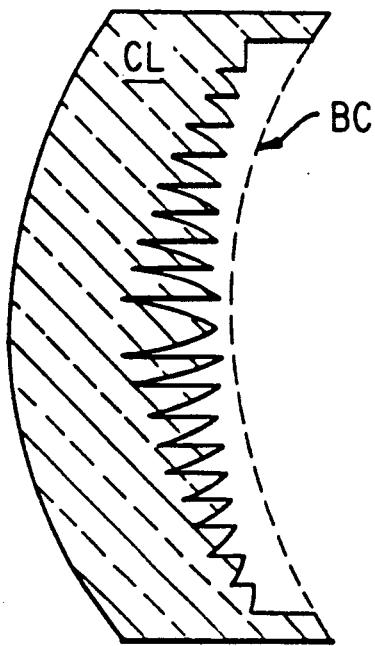
FIG. 9 illustrates a cross-sectional side view of a contact lens CL designed with base curve BC. This lens contains a composite of phase plates with echelettes of continuously varying depths. The outer echelettes are the shallowest and are set back increasingly from the base curve of the lens to form phase shifting channels.

The embodiment of the invention shown in FIG. 9 is a contact lens CL designed with a base curve BC. This lens contains a composite of phase plates with echelettes of continuously varying depths. The outer echelettes are the shallowest and are set back increasingly from the base curve of the lens to form phase shifting channels according to the invention. Again, in accordance with this invention, the line through the centers of all of the echelettes will parallel the base curve. In this embodiment, the echelette depths are monotonically decreasing from the lens center outward.

Figure 10:
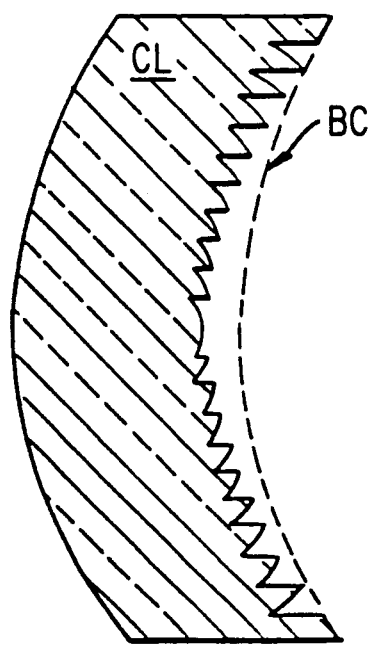
FIG. 10 illustrates a cross-sectional side view of a contact lens CL designed with a base curve BC. This lens contains a composite of phase plates with echelettes of continuously varying depths. The outer echelettes are the deepest and are set back from the base curve of the lens sufficient to allow the lens to drape to the base curve.

The embodiment of the invention shown in FIG. 10 is a contact lens CL designed with a base curve BC and containing a composite of phase plates with echelettes of continuously varying depths. In this case, the outer echelettes are the deepest and are set back from the base curve of the lens to only that amount to allow the lens to drape to the base curve according to the invention. In this embodiment, the echelette depths are monotonically increasing from the lens center outward. In this case a line through the centers of all of the echelettes will be flatter than the base curve of the lens until it is draped over the eye.

A desirable lens encompassed by this invention has an optic zone of about 6 to about 8 millimeters comprising a concentric phase plate of about 4 to about 5 millimeters in diameter, viz., about 4.5 millimeters in diameter, and an annular channel having a width of about 0.5 to about 2.0 millimeters.

In those situations where the degree of mobility of the lens is extreme but the level of glare reduction achieved by the practice of the invention is considered most desirable, the lens may be modified by inclusion of the keel construction described in commonly assigned copending U.S. patent application Ser. No. 07/120,263, filed on Nov. 12, 1987, now abandoned, to decrease the level of mobility yet retain the advantages of the invention which is incorporated herein by reference.

FIG. 11A illustrates a cross-sectional side view of a contact lens CL designed with base curve BC. This lens contains a phase plate with echelettes of the same depth each having a parabolic profile. As shown in FIG. 11A, contact lens CL includes, for example, six zones 1-6 defined by radii $R_1$-$R_6$, respectively. Each of the six zones 1-6 includes one echlette or step having a surface, 100-106, respectively having a parabolic profile. The step height, that is the height of the step between echelettes is substantially the same for all of the echelettes. For example, in the case where the step height has an optical path length of substantially one-half the design wavelength, the split of light between the $0^{th}$ and $1^{st}$ order images is substantially 40/40. That is, 40% of the light incident on contact lens CL is diffracted to the $0^{th}$ order image and 40% of the light incident on the contact lens CL is diffracted to the $1^{st}$ order image.

FIG. 11B illustrates a cross-sectional side view of a contact lens CL designed with base curve BC. This lens contains a phase plate with echelettes of varying depth each having a parabolic profile. In the lens of FIG. 11B, each of the six zones 1-6 includes one echelette, the zones being bounded by radii $R_1$-$R_6$. Each of the six echelettes includes an echelette surface 200-206. In the contact lens CL of FIG. 11B, the echelette surfaces are all parabolic, but the depths of the steps between the echelettes varies. By way of example, with no limitations intended or implied, the step height of the first and second echelettes can be 0.55 of the design wavelength in optical path length, the step height of the third and fourth echelettes can be 0.45 of the design wavelength in optical path length, and the step height of the fifth and sixth echelettes can be 0.35 of the design wavelength in optical path length. Given the foregoing exemplary echelette step heights and that the surface of all the echelettes is parabolic, the first and second zones will split light approximately 50% to the $1^{st}$ order image and 30% to the $0^{th}$ order image, the third and fourth zones will split light approximately 34% to the $1^{st}$ order image and 47% to the $0^{th}$ order image, and the fifth and sixth zones will split light approximately 20% to the $1^{st}$ order image and 64% to the $0^{th}$ order image.

Thus, as the aperture of the eye increases, more of the light is shifted to the $0^{th}$ order image from the $1^{st}$ order image to favor far vision over near. Clearly, by reversing the progression of step height, that is going from a small step height in the first two zones to a larger step height in the outer zones, the light shift can be reversed so that near vision of favored over far as the aperture of the eye increases.

Moreover, while the present invention has been described having reference to a zone plate that divides light between the $0^{th}$ and $1^{st}$ order images, it should be understood that the present invention can be applied to zone plates that divide light between other orders. For example, a zone plate can be utilized in a lens in accordance with the present invention that divides light between the $0^{th}$ and negative $1^{st}$ order images.

In the embodiment of the invention as shown in FIG. 11C, there is a cross-sectional view of a soft contact lens CL, with a surface relief profile, formed into its posterior surface. The surface relief profile, comprises in this embodiment 6 annular zones, two each of a different profile. The central 2 zones have, for example, a cosine profile formed onto the surface of the echelettes, the cosine profile being defined by the following formula:

$$\Delta(r) = \{0.45\lambda/(n'-1)\}\{0.5 + 0.5(\cos[(\pi r^2/2\lambda f)])\}.$$

where:
r = radius from the optical axis,
λ = the design wavelength,
n' = the index of refraction of lens material, and
f = first order focal length Preferably, the step height between adjacent zones is constant. That is, for the example shown in FIG. 11C, the optical path length for the step between each of the six zones is equal. Most preferably, for the example that follows in reference to FIG. 11C, the step height is 0.45 λ, where λ is the design wavelength.

For a further explanation of the structure and function of the cosine profile, attention is drawn to U.S. patent application Ser. No. 07/237,292, filed Aug. 26, 1988, now abandoned which is specifically incorporated herein by reference. The central two zones, having surfaces with a cosine profiles as defined, produce a 49-31% split of light which favors the $1^{st}$ order image.

The intermediate two zones use, for example, a parabolic profile given by:

$$\Delta(r) = \{0.45\lambda/(n'-1)\}\{1 - r^2/(2\lambda f)\}$$

The intermediate two zones, using the parabolic profile as defined, produce a 34-47% split of light slightly favoring the $0^{th}$ order image.

The outermost peripheral two zones use, for example, an elliptic profile given by:

$$\Delta(r) = \{0.45\lambda/(n'-1)\}\{1 - r^2/(2\lambda f)\}^{\frac{1}{2}}$$

The outer two zones, using the elliptic profile as defined, produce a 20-63% split of light greatly favoring the $0^{th}$ order image.

The contact lens of the embodiment shown in FIG. 11C is taken, for example, to have a carrier power F=−0.50 D, while the transmission profile is based upon a design wavelength λ=550 nm, and a first order focal length f=0.66 m. Thus, this contact lens will have a $0^{th}$ order image corresponding to a distance focal power of −0.5 D, and a $1^{st}$ order image corresponding to an add power of 1/f=1.50 D.

This bifocal phase plate contact lens shifts the share of light between the $0^{th}$ and $1^{st}$ order images as the pupil of the eye opens and closes. In particular, it shifts more light into the $1^{st}$ order, or near image, as the pupil of the eye closes down for reading. The importance of this configuration is that it embraces this property in a bifocal phase plate contact lens with surface cuts of a uniform depth. For a soft contact lens, this avoids the problems associated with drapage upon the eye.

The lens of the invention may be made by conventional processes in the art. For example, anhydrous versions of the material of a soft contact lens may be ground to provide the lens structures of the invention. Lenses may be cast from molds replicating the lens structures of the invention. The lenses may be made of glass or conventional plastics used for making contact lenses.

It will be apparent to those skilled in the art that various modifications and variations can be made in the multifocal ophthalmic lens of the present invention without departing from the scope or spirit of the invention. Thus, it is intended that the present invention cover the modifications and variations of this invention provided they come within the scope of the appended claims and their equivalents.

What is claimed is:

1. An ophthalmic lens comprising:
   a. a carrier lens having an anterior surface and a posterior surface; and
   b. a zone plate disposed about an optical axis of the carrier lens on at least one of the anterior and posterior surfaces, said zone plate having a plurality of annular zones, each of which is spaced from the optical axis by a distance proportional to the square root of n, where n is the number of the zone starting from the optical axis, each of said zones having at least one echelette and each of said echelettes having a surface through which light propagating parallel to said optical axis and incident upon said zone plate is diffracted to at least two focal points, the surfaces of said echelettes having nonuniform profiles to cause the relative intensities of light diffracted to said at least two focal points to vary as the size of an aperture disposed along said optical axis adjacent to the carrier lens is varied within the diameter of the zone plate.

2. An ophthalmic lens as claimed in claim 1 further including a step between each of the zones, the height of each step having substantially the same optical path length.

3. An ophthalmic lens as claimed in claim 1 wherein said desired orders of diffraction are the $0^{th}$ and $1^{st}$ orders of diffraction.

4. An ophthalmic lens as claimed in claim 1 wherein said desired orders of diffraction are the $0^{th}$ and negative $1^{st}$ orders of diffraction.

5. An ophthalmic lens as claimed in claim 3 wherein the intensity of light diffracted to the $0^{th}$ order of diffraction increases and the intensity of light diffracted to the $1^{st}$ order of diffraction decreases as the size of the aperture increases.

6. An ophthalmic lens as claimed in claim 3 wherein the intensity of light diffracted to the $0^{th}$ order of diffraction decreases and the intensity of light diffracted to the $1^{st}$ order of diffraction increases as the size of the aperture increases.

7. An ophthalmic lens as claimed in claim 1 wherein said phase zone plate includes at least two sets of one or more annular zones in each set, each of the one or more annular zones in each set including echelettes and each of the echelettes including a surface, the surfaces of the echelettes in each of the at least two sets of one or more annular zones being selected from a cosine, parabolic, and elliptical profile such that at least two different ones of the cosine, parabolic, and elliptical profiles are included in said zone plate.

8. An ophthalmic lens as claimed in claim 7 wherein the surfaces of echelettes in a first set of zones have a cosine profile, said first set of zones being disposed closest to the optical axis.

9. An ophthalmic lens as claimed in claim 8 wherein the surfaces of echelettes in a second set of zones have a parabolic profile, said second set of zones being disposed radially outward from the optical axis relative to the first set of zones.

10. An ophthalmic lens as claimed in claim 9, wherein the surfaces of echelettes in a third set of zones have an elliptic profile, said third set of zones being disposed radially outward from the optical axis relative to the second set of zones.

11. The ophthalmic lens of claim 1 wherein said aperture is a pupil of an eye disposed along said optical axis.

12. An ophthalmic lens comprising:
   a carrier lens having an anterior side and a posterior side;
   a zone plate having a plurality of zones disposed annularly about the optical axis of the carrier lens on at least one of the anterior or posterior sides, each of the zones being spaced from the optical axis in proportion to the square root of n, where n is the zone number;
   at least one echelette being disposed in each of the zones, each of the echelettes having a surface through which light propagating along the optical axis traverses, the surface of the echelettes varying from the zone nearest the optical axis to the zone furthest from the optical axis so that as the size of an aperture disposed along the optical axis changes within the diameter of the zone plate the relative intensity of light diffracted to different orders of diffraction changes.

13. An ophthalmic lens as claimed in claim 12 further including a step between each of the zones, the height of each step having substantially the same optical path length.

14. An ophthalmic lens as claimed in claim 12 wherein said desired orders of diffraction are the $0^{th}$ and $1^{st}$ orders of diffraction.

15. An ophthalmic lens as claimed in claim 12 wherein said desired orders of diffraction are the $0^{th}$ and negative $1^{st}$ orders of diffraction.

16. An ophthalmic lens as claimed in claim 14 wherein the intensity of light diffracted to the $0^{th}$ order of diffraction increases and the intensity of light diffracted to the $1^{st}$ order of diffraction decreases as the size of the aperture increases.

17. An ophthalmic lens as claimed in claim 14 wherein the intensity of light diffracted to the $0^{th}$ order of diffraction decreases and the intensity of light diffracted to the 1$^{st}$ order of diffraction increases as the size of the aperture increases.

18. An ophthalmic lens as claimed in claim 12 wherein said zone plate includes at least two sets of one or more annular zones in each set, each of the one or more annular zones in each set including echelettes and each of the echelettes including a surface, the surfaces of the echelettes in each of the at least two sets of one or more annular zones being selected from a cosine, parabolic, and elliptical profile such that at least two different ones of the cosine, parabolic, and elliptical profiles are included in the zone plate.

19. An ophthalmic lens as claimed in claim 18 wherein the surfaces of echelettes in a first set of zones have a cosine profile, said first set of zones being disposed closest to the optical axis.

20. An ophthalmic lens as claimed in claim 19, wherein the surfaces of echelettes in a second set of zones have a parabolic profile, said second set of zones being disposed radially outward from the optical axis relative to the first set of zones.

21. An ophthalmic lens as claimed in claim 20, wherein the surfaces of echelettes in a third set of zones have an elliptic profile, said third set of zones being disposed radially outward from the optical axis relative to the second set of zones.

22. The ophthalmic lens of claim 12 wherein said aperture is a pupil of an eye disposed along said optical axis.

23. An ophthalmic lens comprising:
 a. a carrier lens having an anterior surface and a posterior surface; and
 b. a zone plate disposed about an optical axis of the carrier lens on at least one of the anterior and posterior surfaces, said zone plate having a plurality of annular zones, each of which is spaced from the optical axis by a distance proportional to the square root of n, where n is the number of the zone starting from the optical axis, said zone plate including a step between each zone, the height of the step being equal for all zones in the zone plate, each of said zones having at least one echelette and each of said echelettes having a surface through which light propagating parallel to said optical axis and incident upon said zone plate is diffracted to at least two focal points, the surfaces of said echelettes having nonuniform profiles to cause the relative intensities of light diffracted to said at least two focal points to vary as the size of an aperture disposed along said optical axis adjacent to the carrier lens is varied within the diameter of the zone plate.

24. The ophthalmic lens recited in claim 23, wherein:
 (i) the surfaces of echelettes in a first set of zones have a cosine profile, said first set of zones being disposed next to the optical axis,
 (ii) the surfaces of echelettes in a second set of zones have a parabolic profile, said second set of zones being disposed radially outward from the optical axis relative to the first set of zones, and
 (iii) the surfaces of echelettes in a third set of zones have an elliptic profile, said third set of zones being disposed radially outward from the optical axis relative to the second set of zones.

25. The ophthalmic lens of claim 23 wherein the step between each zone has an optical path length of substantially 0.45 $\lambda$, where $\lambda$ is the design wavelength.

26. The ophthalmic lens of claim 23 wherein said aperture is a pupil of an eye disposed along said optical axis.

* * * * *